2,840,611

PREPARATION OF ACRYLAMIDE

Norbert M. Bikales, Stamford, Conn., and Mary L. Miller, New York, N. Y., assignors to American Cyanamid Company, New York, N. Y., a corporation of Maine No Drawing. Application August 25, 1955
Serial No. 530,644

7 Claims. (Cl. 260—561)

This invention relates to acrylamide. More particularly, it relates to the preparation of acrylamide. Still more particularly, it relates to the preparation of an iron-free acrylamide product.

Acrylamide and its polymerization and copolymerization products have become of increasing importance in various fields. Particularly, these products have been found of various usefulness in the fields of adhesives, dispersants, plasticizers, surface coatings and thickening agents, as well as in the leather, paper, rubber, textile, and photographic arts.

One method of preparing acrylamide comprises reacting acrylonitrile with sulfuric acid and water to form acrylamide sulfate. Hydration is generally conducted in the presence of any of various known polymerization inhibitors of which ferrous sulfate is one of the most effective. Generally, it is used in amounts of about 0.1% by weight of the reaction mixture. Upon completion of hydration, monomeric acrylamide is then isolated from the resultant acrylamide sulfate.

It has been proposed to recover acrylamide from acrylamide sulfate by neutralizing the latter in water using an alkaline material such as ammonia, an alkali metal or alkaline earth metal hydroxide or carbonate and the like. When ferrous sulfate is employed as a polymerization inhibitor in the hydration procedure, serious difficulty has been encountered when neutralizing in water, in lowering the iron content of the neutralization medium. As a result, iron build-up occurs in the process liquors until they become dark brown in color. Crystallization of acrylamide therefrom results in a product having a very definite "rusty" appearance. Such discoloration renders acrylamide useless in the manufacture of many products. In addition, the iron content causing this discoloration adversely affects polymerization and copolymerization of the acrylamide, resulting in unreproducible polymers and copolymers, and, in general, products of lower molecular weight than would be obtained in the absence of iron.

Various physical and chemical methods have been suggested for reducing the iron content of such aqueous iron-bearing acrylamide liquors, and/or crystalline acrylamide produced therefrom. However, none of these nor any combination thereof has been a wholly satisfactory solution to the problem. For instance, the most common solution to this type of problem, i. e., recrystallization, is expensive as well as being incomplete in iron separation. There has remained, therefore, a need for a suitable method for lowering the iron content of such acrylamide liquors.

It is the principal object of this invention to provide a method which adequately meets this need. Such a method, to be practical, must necessarily meet certain requirements. It should be capable of producing an acrylamide product sufficiently low in iron content so as to avoid interference with subsequent polymerization, as well as to render it suitable for all intended end uses. Achievement of this, moreover, should be obtained without introducing into the acrylamide product other objectionable impurities and without extensive additional handling of reaction liquors.

These objects have been met in a simple, yet surprisingly effective, manner. In accordance with this invention, it has now been found that iron can be precipitated from such aqueous iron-bearing acrylamide liquors by the addition thereto, or to the acrylamide sulfate liquor from which it is derived, of a material characterized in that it contains an anion of an inorganic acid of phosphorus and a cation comprising at least one member selected from the group consisting of H, $NH_4$, the alkali metals and the alkaline earth metals. As illustrative of the materials employed as precipitating agents according to this invention, there might be mentioned, for instance, hypophosphorous acid, phosphorous acid, orthophosphoric acid, ammonium dihydrogen orthophosphate, monocalcium orthophosphate, sodium metaphosphate, sodium pyrophosphate, sodium tripolyphosphate and the like.

The mechanism by which substantially complete precipitation of the iron content of an acrylamide liquor is obtained by the simple addition of a precipitating agent of the above-described class is not understood. Nor is there any desire to limit this invention by any particular theory of operation. While it is known, for instance, that phosphates may form insoluble salts with iron, this does not appear to be the mechanism of the instant precipitating action since the iron appears to be present as colloidal and not as ionic iron. Moreover, other materials capable of forming insoluble salts with iron give little, if any, iron precipitation from an iron-bearing acrylamide liquor. It is also known that some materials may precipitate colloids because of their multiple charge. However, other polyvalent ions, such as polyacrylate and sulfate, the latter present in large quantities in any aqueous neutralization medium, are not effective in removing iron content. Furthermore, iron precipitation is successfully obtained using monovalent precipitating agents, e. g., hypophosphorous acid. The objects of this invention, therefore, are not only successfully attained, but this success is totally unexpected in view of the ineffectiveness of other materials having properties similar to those of the precipitating agents of this invention.

It is an advantage of this invention that precipitation of the iron content may be practiced over a wide range of hydrogen ion concentrations. It has been found, however, that in order to effect optimum iron precipitation the pH should not be much below about 2. At the other end of the scale there appears to be no restrictions on pH except those imposed by the particular neutralization procedure with which this invention may be practiced. Thus, for example, if the neutralizing agent is ammonia, the pH will be maintained at below about 7, whereas when using lime it may be as high as 10 and, in some instances, even as high as 12.

Because alkalinity does not adversely affect iron removal this invention may be readily practiced as a part of the neutralization procedure regardless of what neutralizing agent is employed. When operating a batch neutralization process, the precipitating agent may be added before or during the neutralization, or after neutralization is complete. Preferably, however, it is added prior to or during neutralization, since it has been unexpectedly found that the presence in the liquor of the reaction product of the precipitating agent and the iron exhibits an unusual inhibiting effect on the polymerization of acrylamide. Consequently greater processing safety with respect to polymerization is gained during neutralization. When conducting the neutralization in a continuous manner, the same results and advantages are obtained by periodic addition of the precipitating agent to the neutralizer.

The amount of precipitating agent needed to render the final acrylamide product acceptable for its various intended purposes is not easily defined. Much depends on the particular precipitating agent employed. It has been found, generally, that addition of the precipitating agent in an amount such as to provide a mole ratio with the iron content of about 0.5:1–5:1 is usually adequate to reduce the iron content to a level acceptable for polymerization purposes, i. e., about 10 p. p. m. The actual amount required for any particular case is only a matter of simple experimentation and can be readily determined. In accordance with this invention, it has been found preferable to employ the precipitating agent, as a general practice, in a molecular ratio to the iron content greater than about 1:1 to insure obtaining the desired effect. It is an added advantage of this invention, however, that the use of a precipitating agent in an amount greater than that actually required is not objectionable. In many instances, the excess of precipitating agent has been found to be substantially insoluble in a concentrated acrylamide solution and may be separated with the precipitated sulfate and iron contents. Any precipitating agent which may remain in the final acrylamide product has been found to have negligible effect on polymerization.

Addition of the precipitating agent is preferably practiced with agitation to insure thorough dispersion throughout the reaction mass. Precipitation may be effectively conducted over a wide range of temperatures but it has been found that the rate thereof increases with increasing temperatures. It is desirable, therefore, to practice the invention at a temperature greater than about 20° C. and preferably from about 40–60° C. Within this latter range of temperatures, iron precipitation has been found to be complete to the extent desired in less than 15 minutes and in many instances in less than 1 minute.

On completion of iron precipitation, the iron-bearing precipitate may be separated by conventional means as by filtration. When iron precipitation is conducted apart from a neutralization procedure, it may be necessary to add a small quantity of a filter aid. In the presence of an ammonium or an alkali metal or alkali earth metal sulfate as obtained from neutralization, however, no added filter aid need be added. It is a further additional advantage of this invention, moreover, that the precipitated sulfate is considerably lighter in color than that obtained by neutralizing in the absence of a precipitating agent according to this invention. When the sulfate is a valuable one such as ammonium sulfate, this improvement in appearance enhances its marketability.

The process of this invention is further illustrated by the following examples:

Example 1

To 100 parts of a brown-colored aqueous acrylamide process liquor obtained by the reaction of an iron-bearing acrylamide sulfate liquor with ammonia in aqueous medium and containing 73% acrylamide, 1.3% ammonium sulfate and 900 p. p. m. of iron is added, with agitation and at a temperature of 55° C. and a pH of about 6, 3.5 parts of a 0.36 molar solution of orthophosphoric acid. Coagulation is observed almost immediately. After 10 minutes the solution is filtered through a filter aid to separate the iron-bearing precipitate. The filtrate, containing 10 p. p. m. of iron, is cooled and crystallized acrylamide separated. The filtrate is nearly colorless and the acrylamide snow white and highly suitable for polymerization and copolymerization purposes.

Example 2

Example 1 is repeated except that the pH of the acrylamide solution is adjusted to a pH of 3 with concentrated sulfuric acid. On separation of the iron-bearing precipitate, a substantially colorless filtrate containing 10 p. p. m. of iron is obtained from which a snow white acrylamide product is crystallized.

Example 3

The procedure of Example 1 is repeated except that ammonium dihydrogen phosphate in the amount of 7 parts of a 0.36 molar solution is employed as the precipitating agent. The iron content is almost instantaneously precipitated to give a colorless liquor containing less than 5 p. p. m. iron from which a white crystalline acrylamide product is obtained.

Example 4

To 50 parts of a brown-colored aqueous acrylamide process liquor obtained by the reaction of an iron-bearing acrylamide sulfate liquor with an aqueous sodium hydroxide solution in water and containing 68% acrylamide, 0.6% sodium sulfate and 900 p. p. m. of iron is added, with stirring at a temperature of 55° C., and a pH of 8, 0.4 part of sodium pyrophosphate dissolved in a minimum of water. After 10 minutes the iron-bearing precipitate is separated, leaving a colorless residual liquor having an iron content of less than 10 p. p. m. from which a white crystalline product is separated.

Example 5

Example 4 is repeated using sodium metaphosphate as the precipitating agent. Again, the iron content of the solution is quickly reduced to an acceptable level giving a colorless liquor from which a white crystalline acrylamide product is obtained.

Example 6

The procedure of Example 5 is repeated except that the process liquor contains 40% acrylamide and the precipitating agent is added at room temperature. Similar results are obtained in about 30 minutes.

Example 7

To the brown acrylamide liquor of Example 1 is added, at 60° C. and a pH of about 6, 0.5 part of hypophosphorous acid. After 15 minutes the iron-bearing precipitate is separated and residual solution cooled to crystallize white acrylamide which upon filtration is found to contain less than 10 p. p. m. iron.

Example 8

To 25 parts of a brown-colored aqueous acrylamide liquor, obtained by the reaction of an iron-bearing acrylamide sulfate and ammonia in aqueous medium and containing 73% acrylamide, 1.3% ammonium sulfate and 314 p. p. m. iron, at 55° C. and a pH of about 6 is added 0.08 part of sodium tripolyphosphate in the form of an aqueous solution. Iron precipitation takes place within 5 minutes leaving a colorless liquor containing less than 5 p. p. m. of iron.

Example 9

Example 8 is repeated except that the process liquor contains 500 p. p. m. of iron and 0.25 part of solid monocalcium orthophosphate is added and the temperature raised to 65° C. After 15 minutes substantial iron precipitation has taken place.

The above examples illustrate the efficacy of the process of this invention using as precipitating agents materials representative of compounds containing an anion of a inorganic acid of phosphorus and a cation comprising at least one member selected from H, $NH_4$, the alkali metals and the alkali earth metals. Similar results are obtained when using as precipitating agents other compounds of this class.

The following examples illustrate the improved stability of an aqueous iron-bearing acrylamide solution obtained by the addition of a precipitating agent in accordance with this invention.

Example 10

A sample of an aqueous brown acrylamide process liquor obtained by the neutralization of an iron-bearing acrylamide sulfate liquor with ammonia in water and containing 73% acrylamide, 1.3% ammonium sulfate and 100 p. p. m. iron is stirred in an open vessel at 55° C. Vigorous polymerization of the vessel contents is observed in 12 hours.

Example 10 is repeated except that an amount of orthophosphoric acid is added sufficient to give with the iron content a mole ratio of 1:1. After 128 hours the test is discontinued with no evidence of polymerization.

We claim:

1. A method of treating an aqueous iron-bearing solution of acrylamide which comprises precipitating iron by adding to said solution at least one compound containing an anion of an inorganic acid of phosphorus ad a cation selected from the group consisting of H, $NH_4$, the alkali metals and the alkaline earth metals.
2. A method according to claim 1 in which the compound is orthophosphoric acid.
3. A method according to claim 1 in which the compound is ammonium phosphate.
4. A method according to claim 1 in which the compound is sodium tripolyphosphate.
5. A method according to claim 1 in which the compound is sodium metaphosphate.
6. A method according to claim 1 in which the compound is sodium pyrophosphate.
7. A stabilized aqueous acrylamide solution containing precipitated iron prepared by precipitating iron from an aqueous iron-bearing solution of acrylamide by adding thereto at least one compound containing an anion of an inorganic acid of phosphorus and a cation selected from the group consisting of H, $NH_4$, the alkali metals and the alkaline earth metals.

References Cited in the file of this patent

FOREIGN PATENTS

| | | |
|---|---|---|
| 631,592 | Great Britain | Nov. 7, 1949 |

OTHER REFERENCES

Chem. Abst., vol. 41 (1947), page 3891.
Chem. Abst., vol. 41 (1947), page 6003.

UNITED STATES PATENT OFFICE
CERTIFICATE OF CORRECTION

Patent No. 2,840,611                                                        June 24, 1958

Norbert M. Bikales et al.

It is hereby certified that error appears in the printed specification of the above numbered patent requiring correction and that the said Letters Patent should read as corrected below.

Column 5, line 18, for "ad" read -- and --.

Signed and sealed this 21st day of October 1958.

(SEAL)
Attest:
KARL H. AXLINE
Attesting Officer

ROBERT C. WATSON
Commissioner of Patents